Patented July 13, 1948

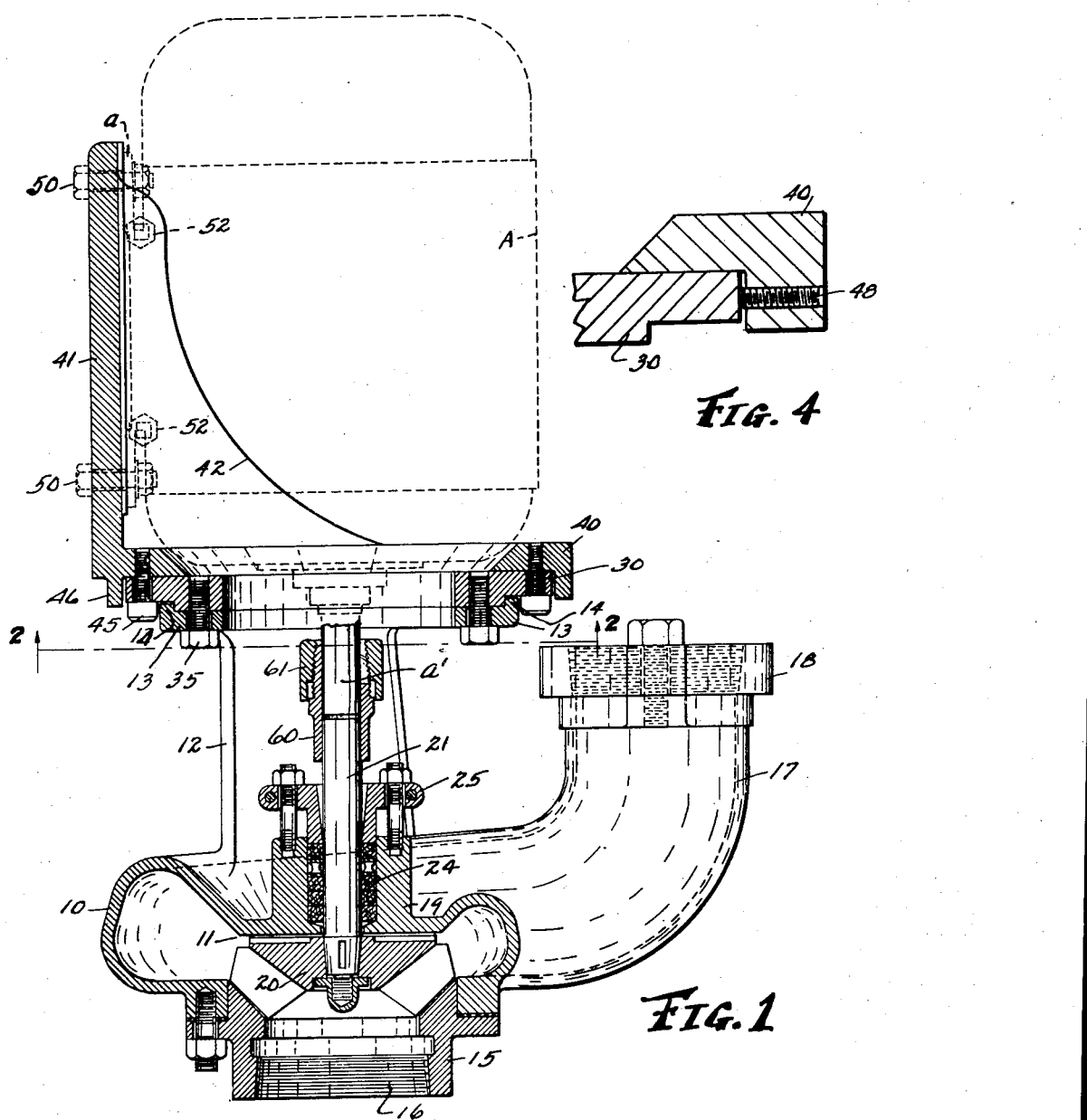

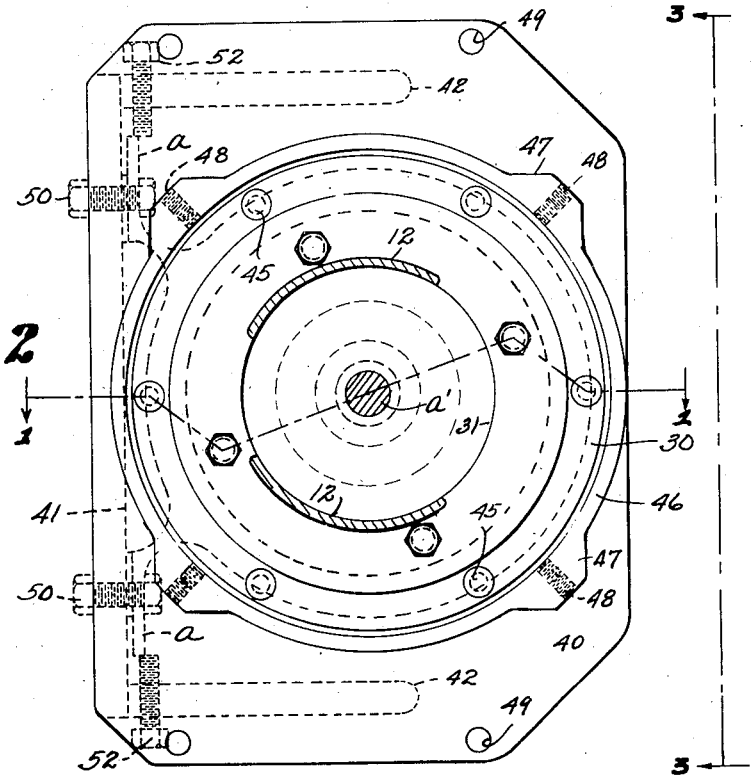
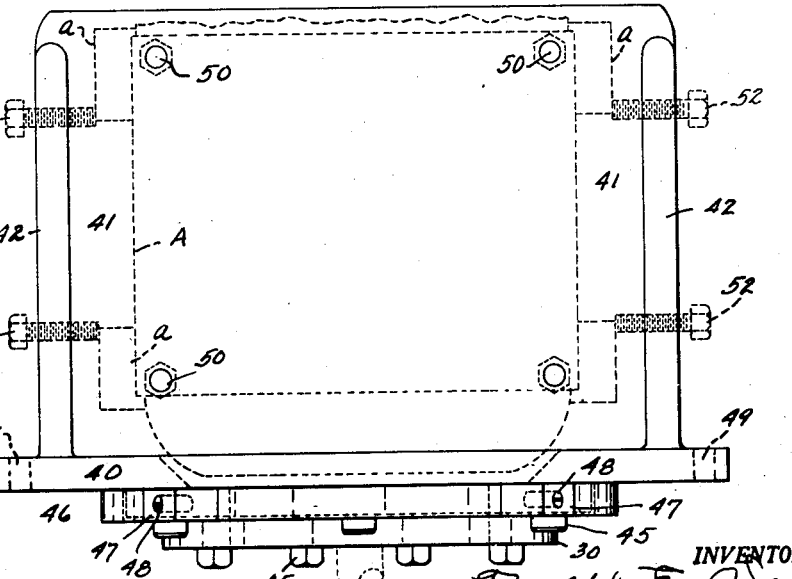

2,445,182

UNITED STATES PATENT OFFICE 2,445,182

MEANS FOR CONNECTING A DRIVING MOTOR TO THE SHAFT OF A ROTARY PUMP

Ralph E. Odey, Salem, Ohio, assignor to The Deming Company, Salem, Ohio, a corporation of Ohio Application November 1, 1946, Serial No. 707,085

12 Claims. (Cl. 103—87)

1

This invention relates to improvements in means for connecting a driving motor to a driven member, as for example to the driving shaft of a rotary pump.

At the present time, rotary pumps, compressors, or similar power driven machines, are usually connected to the driving motor by either of two methods. In the first method, the pump and motor are mounted on a common base and the shafts are connected by flexible coupling, this flexible coupling being required to take up the inaccuracies of mounting. In the second method, the pump and motor are mounted as a unit, the alignment being effected by a rabbet fit between the end castings of pump and motor, the shaft of the motor being extended to receive the pump impeller, or the motor shaft being connected to a separate pump shaft by a rigid coupling.

Whereas under the first method both pump and motor have their own bearings and the inaccuracies of mounting are taken up by flexible coupling; under the second method the motor bearings are used to support the rigid rotor consisting of motor and pump parts. In this second method, the common shaft of close coupled design must be supported by the motor bearings and the impeller end of the shaft must be centrally true within close tolerance, that is, it should not run out more than about 2/1000 of an inch on small pumps.

The motors now manufactured for flexible coupling drive under the first method are not fitted with end bells having a rabbet fit, the alignment to the pump being made on the base with shims or the like. Such motors are standardized and constitute the majority of motors sold.

The motors under the second method have an end bracket with rabbet fit to align motor and pump parts to the common shaft axis. These motors are not universally available, but are made to order for individual manufacturers and the quantity of such motors is small as compared to standard motors used in the first method.

My invention comprises means providing a method to transform a motor without rabbet fit end bells into a motor which can be accurately aligned with the pump parts as if it had a rabbet fit end bell. In this manner, it is possible to use standard motors and connect them by rigid coupling to pumps, utilizing motor bearings for the support of both motor and pump rotating elements.

My device can be used for both horizontal and

2 vertical mounting, provided the shaft of the motor is on a fixed axis and does not float. This usually requires a motor with ball bearings or roller bearings.

In accomplishing my objects, I provide an adapter plate adapted to be mounted on the pump frame and a chair for carrying the motor and adapted for adjustable mounting on the adapter plate. This will be hereinafter described in connection with the accompanying drawings which disclose an approved embodiment of the invention.

In the drawings, Fig. 1 is an axial section through an impeller pump with its drive shaft coupled to the shaft of a motor carried by my intermediate adapter plate and chair, this section being on offset planes as indicated by the line 1—1 on Fig. 2; Fig. 2 is a bottom plan of the adapter plate and chair, this view being sectioned through the motor shaft substantially as indicated by the line 2—2 on Fig. 1 looking upwardly; Fig. 3 is an elevation of the chair and adapter plate looking from a position indicated by the line 3—3 on Fig. 2; and Fig. 4 is a detail in vertical section through the adapter plate and chair, as indicated, for instance, by the line 4—4 on Fig. 2.

In Fig. 1, 10 indicates a pump frame having a volute housing 11 and shown with an upstanding support 12 terminating in a horizontal top ring 13. The frame is shown as secured on its underside to a sleeve 15 which is formed at its upper end with an inclined face coacting with the impeller and is provided with internal threads 16 by which it may be effectively mounted on a suction pipe (not shown). The volute housing merges into an upwardly extending discharge conduit 17 which may be provided with a suitable threaded fitting 18 for attachment of a delivery pipe (not shown).

I have shown an impeller 20 in the volute housing, the same being mounted on a vertical drive shaft 21 which extends upwardly through a tubular boss 19 on the frame. Within this boss is suitable packing 24 compressed by a sleeve 25.

The particular pump shown in Fig. 1 is of the vertical type and is adapted to be driven by a vertical motor mounted on the annular supporting ring 13 and positioned by a rabbet fit of the motor within an upstanding edge flange 14 of such ring, the downwardly extending armature shaft of such motor accurately aligning with the drive shaft 21 and being tightly coupled thereto.

In adapting this pump to a use with a usual motor without a rabbet fit on its frame, I mount on the ring 13 an adapter plate 30, and I mount on the adapter plate the horizontal portion 40 of a chair having an upstanding or vertical plate portion 41, and I bolt the motor, indicated by broken lines A, directly to this vertical portion of the chair and couple its downwardly extending armature shaft with the pump drive shaft. I will now describe the details of the adapter plate and chair.

The adapter plate 30 is a circular ring. It has on its under face an annular boss 34 projecting downwardly to act as a dowel in coaction with the upward annular flange 14 on the frame ring 13. Cap screws 35 passing through the frame ring are threaded into the adapter ring and accordingly clamp it tightly in place on the frame. These cap screws pass through the same holes in the frame ring which are provided for bolting the normal vertical motor in place.

There is preferably clearance between the cap screws 35 and the frame ring 13 so that the dowel shoulder may be formed to snugly and accurately engage the flange on the frame ring and center the adapter plate without binding the clamping screws.

In the overhanging annular portion of the adapter plate are formed a number of vertical openings for the reception of upwardly extending cap screws 45 to clamp the chair on the adapter plate, six of these cap screws being shown. There is clearance about the cap screws in the adapter plate openings to enable the chair to be shifted slightly thereon as about to be described.

The chair comprises a horizontal plate 40, a vertical plate 41 rising from one edge of the plate 40, and two spaced gussets 42. These three parts (40, 41 and 42) are preferably all one integral casting.

The horizontal portion 40 of the chair has a large circular opening formed through it, preferably flaring upwardly as shown, so that it may readily receive the end portion of the motor frame.

The horizontal member 40 of the chair is formed with a downwardly extending circular flange 46. This flange in four equidistant regions is provided with external bosses 47. Threaded in these bosses and the flange proper are four radiating set screws 48. These set screws abut the edge of the adapter plate and thereby enable a very accurate positioning of the chair thereon, after which the chair is tightly clamped by the screws 45.

The motor, indicated by broken lines A, being of the horizontal type, is naturally provided with extending supporting feet a (shown in dotted lines in Figs. 1–3). These feet furnish means by which the motor frame is secured to the upstanding back 41 of the chair. Bolts designated 50 pass through this chair back 41 and through the feet and carry clamping nuts.

Mounted in each of the gussets 42 of the chair are a pair of clamping screws 52, the inner ends of which abut the side edges of the motor feet a. These screws are effective in accurately adjusting the position of the motor frame transversely of the chair, after which the screws 50 are tightened.

The base plate 40 of the chair is indicated in Figs. 2 and 3 as extending horizontally in opposite directions beyond the gusset plates 42, such extensions being provided with openings 43. These openings enable the chair to be bolted to any suitable underlying cross-bars or frame to brace the superstructure, if desired.

The motor is mounted on the chair and adjusted so that the shaft is at right angles with the plate 30, regardless of its central location. Then the shaft is centrally located by adjusting the screws 48, moving plate 40 on the plate 30. After the motor is mounted in the chair so that the motor shaft is at right angle and also in the center of the plate 30, the pump shaft can be attached to the motor shaft. Then the motor with the pump shaft can be attached to the pump frame 12 and securely fastened to its flange 13. Finally, the impeller 20 and suction casting 15 are installed, completing the assembly.

It will be seen that by the provision of my adapter plate and chair adjustably mounted thereon, I am able to take a standard motor without the end bell and locate it properly as to the pump, so that it will be aligned as accurately as a motor with rabbet fit end bell.

I claim:

1. The combination with a pump having a frame, an impeller and a vertical shaft for operating the impeller, an adapter plate adapted to be secured to the top of the frame, an L-shaped bracket adapted to be secured to the adapter plate and presenting a projecting portion, and means for securing a motor on said projecting portion into position to have its shaft coact with the impeller shaft.

2. The combination with a pump having a frame, an impeller and an operating shaft for the impeller, of an adapted plate adapted to be mounted on the frame, a bracket having two plates at right angles and two spaced gussets connecting them, means for securing one of said bracket plates on the adapter plate, and means for securing a motor to the other of said bracket plates in the region between the gussets with the shaft of the motor aligning with said operating shaft.

3. The combination of a pump, an adapter plate adapted to be mounted thereon, an L-shaped bracket having one of its arms adapted to be mounted on the adapter plate, means coacting with the bracket and the adapter plate to adjust the position of the bracket, and means for clamping the bracket in adjusted position to the adapter plate, and means for mounting a motor on the other arm of the L-shaped bracket, there being registering openings in the central regions of said adapter plate and the adjacent portion of the bracket through which the armature shaft of the motor may extend into aligned engagement with the pump shaft.

4. The combination with a pump having a frame, an impeller and an operating shaft for the impeller, and an adapter plate adapted to be rigidly mounted across the end of the frame and overhang the same, an L-shaped chair adapted to be mounted on the adapter plate and adjustably secured to its overhanging portion, said chair having a projecting portion, means for adjustably securing a motor on said projecting portion of the chair with the shaft of the motor extending through an opening in the base of the chair into position to coact with the impeller shaft.

5. The combination with a pump having a frame with a ring at one end adapted to carry a motor, an adapter plate adapted to seat on said ring and having a circular shoulder adapted to snugly engage a circular flange on the ring, an L-shaped chair having one portion adapted to be secured to the adapter plate beyond the frame ring, said chair having an extending portion, and means for securing a motor to said extending portion of the chair.

6. The combination of a pump having a frame and an impeller with a driving shaft, of an adapter plate adapted to be secured to the frame and extend in an annular region beyond the same, a bracket bearing against the adapter plate and projecting beyond it, the bracket having portions overhanging the edge of the adapter plate, set screws mounted in said overhanging portions adapted to engage the edge of the adapter plate to adjust the position of the bracket thereon, means for clamping the bracket to the adapter plate, said bracket having a projecting portion, and means for clamping a motor to said projecting portion.

7. The combination of a pump having an impeller housing and a frame provided with a ring-like portion, an impeller in the housing having a shaft extending in a direction normal to the face of said ring-like portion, an adapter plate mounted on said ring-like portion of the frame, provision for clamping the adapter plate to said ring-like portion, said adapter plate extending outwardly beyond the ring-like portion, an L-shaped bracket having one arm resting on the adapter plate and adjustably secured thereto, said bracket having its other arm extending at a right angle to the first-mentioned arm and a pair of spaced gussets connecting both arms, means for bolting the feet of a motor to the upright plate of the bracket between said gussets, and adjusting screws carried by the gussets for positioning the motor transversely.

8. The combination of a pump having an impeller housing and a frame provided with a ring-like portion, an impeller in the housing having a drive shaft an adapter plate mounted on said ring-like portion of the frame with provision for clamping the adapter plate rigidly to said ring-like portion, said adapter plate extending beyond the ring-like portion, an L-shaped bracket having a portion resting on the adapter plate and a portion at a right angle thereto extending from near one edge of the first portion, means for bolting the feet of a motor to the second portion of the bracket, adjusting screws for positioning the motor transversely on the bracket, set screws mounted in extensions of said first portion of the bracket and adapted to abut the edges of the adapter plate to adjust the position of the bracket on the adapter plate.

9. The means for connecting a driving motor to a shaft to be driven comprising an adapter plate adapted to be secured to the frame of the driven member and an L-shaped bracket adapted to be secured to the adapter plate, there being provision for mounting a motor on the projecting arm of the bracket, said bracket being provided with projections overhanging the edge of the adapter plate, and set screws mounted in said projections for adjusting the bracket on the adapter plate.

10. The means for connecting a driving motor to a shaft to be driven comprising an adapter plate adapted to be secured to the frame of the driven member and an L-shaped bracket adapted to be secured to the adapter plate, there being a pair of spaced gussets between the two arms of the bracket, provision for adjustably mounting a motor on the projecting arm of the bracket between said gussets, the other arm of said bracket being provided with projections overhanging the edge of the adapter plate, and set screws mounted in said projections for adjusting the bracket on the adapter plate, there being an opening through the adapter plate and the arm of the bracket engaging it for the passage of the armature shaft of the motor.

11. The combination, with a pump having a frame and a vertical operating shaft and means for securing to the frame a vertical motor with its armature shaft accurately aligned with said operating shaft and coupled thereto, of a chair comprising two plates at right angles to each other, provision for attaching one of said plates to the pump frame in place of the normal vertical motor and attaching a horizontal motor turned vertical to the other plate, the shaft of the motor in either case occupying substantially the same position with reference to the pump shaft.

12. The combination with a vertical shaft and a frame with a horizontal ring at the top formed to make a rabbet engagement with a vertical motor accurately positioned and coupled with said shaft, an adapter plate adapted to seat on said ring in place of such vertical motor and to extend in an annular region beyond said ring, a bracket resting on the adapter plate and projecting beyond it, the bracket having portions overhanging the edge of the adapter plate, set screws mounted in said overhanging portions adapted to engage the edge of the adapter plate to adjust the position of the bracket thereon, means for clamping the bracket to the adapter plate, said bracket having an upstanding portion, and means for clamping a horizontal motor in a vertical position to said upstanding portion with its shaft extending downwardly through the adapter plate and the portion of the bracket resting thereon.

RALPH E. ODEY.

REFERENCES CITED

The following references are of record in the file of this patent:

UNITED STATES PATENTS

| Number | Name | Date |
| --- | --- | --- |
| 2,139,113 | Cline et al. | Dec. 6, 1938 |
| 2,175,576 | Smith | Oct. 10, 1939 |

FOREIGN PATENTS

| Number | Country | Date |
| --- | --- | --- |
| 441,385 | Great Britain | Jan. 20, 1936 |